US008184128B2

(12) United States Patent
Okita

(10) Patent No.: US 8,184,128 B2
(45) Date of Patent: May 22, 2012

(54) DATA DISTRIBUTION SYSTEM AND METHOD THEREFOR

(75) Inventor: Makoto Okita, Tokyo (JP)

(73) Assignee: Hewlett-Packard Development Company, L. P., Houston, TX (US)

(*) Notice: Subject to any disclaimer, the term of this patent is extended or adjusted under 35 U.S.C. 154(b) by 916 days.

(21) Appl. No.: 11/718,228

(22) PCT Filed: Oct. 27, 2004

(86) PCT No.: PCT/JP2004/015904
§ 371 (c)(1),
(2), (4) Date: Apr. 27, 2007

(87) PCT Pub. No.: WO2006/046286
PCT Pub. Date: May 4, 2006

(65) Prior Publication Data
US 2008/0231642 A1    Sep. 25, 2008

(51) Int. Cl.
*G09G 5/00* (2006.01)
*G06F 17/00* (2006.01)
(52) U.S. Cl. ........ 345/619; 345/699; 715/204; 715/251; 715/252
(58) Field of Classification Search .................. 345/619, 345/699; 715/204, 251, 252
See application file for complete search history.

(56) References Cited

U.S. PATENT DOCUMENTS

| 6,781,600 B2 | 8/2004 | Anwar |
| 2002/0010725 A1 | 1/2002 | Mo |
| 2003/0135538 A1* | 7/2003 | Takeuchi et al. ............... 709/200 |
| 2003/0217116 A1* | 11/2003 | Currans ........................ 709/218 |
| 2007/0110037 A1* | 5/2007 | Shin ............................. 370/352 |
| 2008/0218523 A1* | 9/2008 | Zuverink ....................... 345/473 |

FOREIGN PATENT DOCUMENTS

| EP | 0 949 571 A2 | 10/1999 |
| EP | 0949571 A2 | 10/1999 |
| JP | 09-168027 | 6/1997 |
| JP | 2000-76473 A | 3/2000 |
| JP | 2001-117550 | 4/2001 |
| JP | 2002-055912 | 2/2002 |
| JP | 2002-99481 A | 4/2002 |

(Continued)

OTHER PUBLICATIONS

JP09168027 English Translation dated Dec. 14, 1995.

(Continued)

*Primary Examiner* — Michelle L Sams

(57) ABSTRACT

An object of the present invention is to provide a data distribution system which is suitable to distribute data to a mobile terminal device and the like to cause the mobile terminal device and the like to display an image, and a method therefor. In response to a request from a mobile communication device (2) through a web page distribution server (5), a web server (12) distributes document data shown in FIG. 2 to the web page distribution server (5). The web page distribution server (5) creates an image of the distributed document data, and divides the created image into a plurality of areas to thereby create divided area data. In response to the request from the mobile communication device (2), the webpage distribution server (5) sequentially distributes such components of the created divided area data as are to be actually displayed, to the mobile communication device (2). The mobile communication device (2) sequentially displays the divided area data distributed from the web page distribution server (5).

20 Claims, 11 Drawing Sheets

FOREIGN PATENT DOCUMENTS

| | | | | |
|---|---|---|---|---|
| JP | 2002099481 | A | * | 4/2002 |
| JP | 2003108284 | A | * | 4/2003 |
| JP | 2004-200831 | A | | 7/2004 |
| JP | 2004200831 | | | 7/2004 |
| JP | 2004200831 | A | | 7/2004 |
| JP | 2004-220260 | A | | 8/2004 |
| WO | 01/79980 | A1 | | 10/2001 |
| WO | 01/79984 | A1 | | 10/2001 |
| WO | 01/80044 | A2 | | 10/2001 |
| WO | 01/80069 | A1 | | 10/2001 |
| WO | 01/80178 | A2 | | 10/2001 |
| WO | 01/80183 | A1 | | 10/2001 |

OTHER PUBLICATIONS

JP200076473 English translation dated Apr. 7, 1999.
JP09168027 Abstract, Jun. 24, 1997.
JP09168027 dated Dec. 14, 1995.
JP200076473 Abstract, Apr. 7, 1999.
JP200076473 dated Apr. 7, 1999.
English translation of PCT Search Report ~ PCT/JP2004/015904 ~ date of mailing Feb. 2, 2005.
EP Search Report ~ Application No. 04793016.09-2201 dated Nov. 15, 2007.
EP Supplementry Search Report ~ dated Dec. 4, 2007 ~ Application No. 04793016.9 based on PCT/JP2004/015904.
JP IPEA ~ PCT/JP/2004/015904 ~ dated Feb. 14, 2007 (in Japanese).
JP PCT Search Report ~ PCT/JP2004/015904 ~ dated Feb. 8, 2005 (in Japanese).
PCT ~ IPRP ~ dated Aug. 23, 2007 ~ PCT/JP2004/015904 (English).

* cited by examiner

WEB PAGE DATA (DOCUMENT DATA AND ITS IMAGE)

WEB PAGE DISTRIBUTION PROGRAM 50

FIG. 6

| DIVIDED AREA POSITION DATA ( ) | BINARY IMAGE DATA ( ) | LINK DATA ( ) |

DIVIDED AREA DATA OF DIVIDED AREA (i, j)

ARTIFICIAL IMAGE DATA

DATA DISTRIBUTION SYSTEM AND METHOD THEREFOR

RELATED APPLICATIONS

The present application is based on, and claims priority from, PCT Application Number PCT/JP2004/015904, filed Oct. 27, 2004, the disclosure of which is hereby incorporated by reference herein in its entirety.

TECHNICAL FIELD

The present invention relates to a data distribution system which is used in the distribution of web data, and a method therefor.

BACKGROUND ART

For example, Patent Document 1 discloses a method of dividing an image of HTML data to display the image.

Also, Patent Document 2 discloses a method of displaying an image of HTML data (HTML image) on a mobile terminal device (portable terminal device).

However, the method disclosed in Patent Document 1 does not take the display of the HTML image on the mobile terminal device into consideration. Further, since a processing load in a device for displaying the HTML image is heavy in this method, the method is not suitable for the display of the HTML image on the mobile terminal device that has a small display screen and insufficiencies in processing speed of a CPU and memory capacity, compared to a stationary computer.

Also, in the method disclosed in Patent Document 2, since it is necessary to process the HTML data and produce the image on a device for displaying the image, it is impossible to display the information described in a certain foreign language on the mobile terminal device without font data of the foreign language, for example.

Patent Document 1: JP 2001-117550 A
Patent Document 2: JP 2002-55192 A

DISCLOSURE OF THE INVENTION

Problem to be Solved by the Invention

The present invention has been made under the above-mentioned circumstances, and therefore an object of the present invention is to provide a data distribution system which is suitable for data distribution to a mobile terminal device and like with a small display screen and insufficiencies in processing performance and memory capacity to display an image, and a method therefor.

Another object of the present invention is to provide a data distribution device which is capable of displaying an arbitrary image included in the distributed data on a device for displaying the image without being limited by data and performance provided for the display device, and a method therefor.

Means for Solving the Problems

In order to attain the above-mentioned objects, there is provided a data distribution system, including: a subject data distribution device for distributing subject data to be accessed; a display data distribution device for distributing display data that is used for display of contents of the distributed subject data; a data display device for displaying the distributed display data on a display screen having a given size, in which the display data distribution device includes: subject data receiving means for receiving the subject data which is distributed by the subject data distribution device, and whose contents are displayed on the data display device; dividing means for dividing the contents of the received subject data into a plurality of divided areas according to the size of the display screen; display data producing means for producing the display data that is used for displaying the plurality of divided areas which have been obtained by the division; and display data distributing means for distributing the display data that is to be displayed on the display screen to the data display device, and in which the data display device includes: display data receiving means for receiving the display data that has been distributed by the display data distribution device; and data display means for displaying the received display data on the display screen.

Further, according to the present invention, there is provided a data distribution device for distributing display data that is used for displaying contents of subject data to be accessed, and displaying the display data on a display screen having a given size, the data distribution device including: subject data receiving means for receiving the subject data which is accessed and whose contents are displayed on the display screen; dividing means for dividing the contents of the received subject data into a plurality of divided areas according to the size of the display screen; display data producing means for producing the display data that is used for displaying the plurality of divided areas which have been obtained by the division; and display data distributing means for distributing the produced display data to the data display device.

Preferably, each of the divided areas is larger than the display image.

Preferably, the contents of the subject data includes contents data that can be displayed as an image, and the data display device displays an image of the contents data included in the divided areas as contents on the display screen according to divided area position data indicative of a position occupied by the image of the contents data in an image that is obtained from the contents data included in the subject data, the dividing means divides the image of the contents data into the plurality of divided areas according to the size of the display screen, the display data producing means produces the display data including image data indicative of an image of the divided area which is obtained by the division, and the divided area position data of the divided area, and the display data distributing means sequentially distributes the display data that is displayed on the display screen among the produced display data to the data display device.

Preferably, the display data producing means produces the display data including the image data that indicates the image of the divided area which has been obtained by the division by a binary format.

Preferably, the subject data further includes display area data which can be displayed in association with the display area within the image of the contents data, and the data display device further displays the display area data that is associated with the display area included in the image which is included in the divided area on the display screen according to display area position data indicative of the position of the display area in the image that is included in the divided area, and the display data producing means produces the display data including the display area data which is associated with the display area included in the image which is included in the divided area, and the display area position data indicative of the position of the display area in the image that is included in the divided area.

Preferably, the display area data is a URL of a resource that can be accessed from the data display device.

Preferably, the subject data is document data that is distributed from a resource that is accessed from the data display device by the URL.

Further, according to the present invention, there is provided a data display device for displaying display data on a display screen having a given size upon receiving distribution of the display data that is used for displaying contents of subject data to be accessed, the display data being used for displaying any one of a plurality of divided areas obtained by dividing the contents of the subject data according to the size of the display screen, the data display device including: display data receiving means for receiving the distributed display data; and data display means for displaying the received display data on the display screen.

Preferably, each of the divided areas is larger than the display image.

Preferably, the subject data includes contents data that can be displayed on the display screen as an image, the display data includes image data indicative of an image of contents data that is included in the divided area as contents and divided area position data indicative of a position occupied by the image of the contents data in an image that is obtained from the contents data included in the subject data, and the display data that is displayed on the display screen is sequentially distributed, the display data receiving means sequentially receives the distributed display data, and the data display means displays an image indicated by the image data of the divided area which is included in the received display data on the display screen according to the divided area position data indicative of the position of the divided area.

Preferably, the contents of the image data in the divided area which is included in the display data is of a first format, the data display device further including converting means for converting the contents of the image data of the first format into image data of a second format which is different from the first format, and the data display means displays the image data of the second format which is obtained as conversion results on the display screen.

Preferably, the first format is a binary format, and the second format is both or one of a JPEG format and a GIF format.

Preferably, the display data further includes display area data that is associated with the display area included in the image indicated by the image data which is included in the divided area, and display area position data indicative of a position of the divided area in the image which is indicated by the image data included in the divided area, and the data display means further displays display area data that is associated with the display area included in the image indicated by the image data which is included in the divided area on the display screen according to the display area position data indicative of a position of the display area on the image indicated by the image data which is included in the divided area.

Preferably, the display area data is a URL of a resource that can be accessed from the data display device.

Preferably, the subject data is document data that is distributed from a resource that can be accessed from the data display device by the URL.

Further, according to the present invention, there is provided a data distribution method for distributing display data that is used for displaying contents of subject data to be accessed, and displaying the display data on a display screen having a given size, the data distribution method including the steps of: receiving the subject data which is accessed and whose contents are displayed on a data display device; dividing the contents of the received subject data into a plurality of divided areas according to the size of the display screen; producing the display data that is used for displaying the plurality of divided areas which have been obtained by the division; and distributing the produced display data to the data display device.

Further, according to the present invention, there is provided a data display method for displaying display data on a display screen having a given size upon receiving distribution of the display data that is used for displaying contents of subject data to be accessed, the display data being used for displaying any one of a plurality of divided areas obtained by dividing the contents of the subject data according to the size of the display screen, the data display method including the steps of: receiving the distributed display data; and displaying the received display data on the display screen.

Further, according to the present invention, there is provided a first program for distributing display data that is used for displaying contents of subject data to be accessed, and causing the display data to be displayed on a display screen having a given size, the program causing a computer to execute the steps of: receiving the subject data which is accessed and whose contents are displayed on a data display device; dividing the contents of the received subject data into a plurality of divided areas according to the size of the display screen; producing the display data that is used for displaying the plurality of divided areas which have been obtained by the division; and distributing the produced display data to the data display device.

Further, according to the present invention, there is provided a second program for displaying display data on a display screen having a given size upon receiving distribution of the display data that is used for displaying contents of subject data to be accessed, the display data being used for displaying any one of a plurality of divided areas obtained by dividing the contents of the subject data according to the size of the display screen, the program causing a computer to execute the steps of: receiving the distributed display data; and displaying the received display data on the display screen.

EFFECTS OF THE INVENTION

According to the present invention, there are provided a data distribution system which is suitable for data distribution to a mobile terminal device and like with a small display screen and insufficiencies in processing performance and memory capacity to display an image, and a method therefor.

Also, according to the present invention, there are provided a data distribution device which is capable of displaying an arbitrary image included in the distributed data on a device for displaying the image without being limited by data and performance provided for the display device, and a method therefor.

BRIEF DESCRIPTION OF THE DRAWINGS

FIG. 6 is a diagram illustrating divided area data (i, j) of divided areas (i, j) that are produced by a divided area data producing section of the web page distribution program shown in FIG. 5.

BEST MODES FOR CARRYING OUT THE INVENTION

Hereinafter, embodiments of the present invention will be described.

(Network System)

Figure 1:
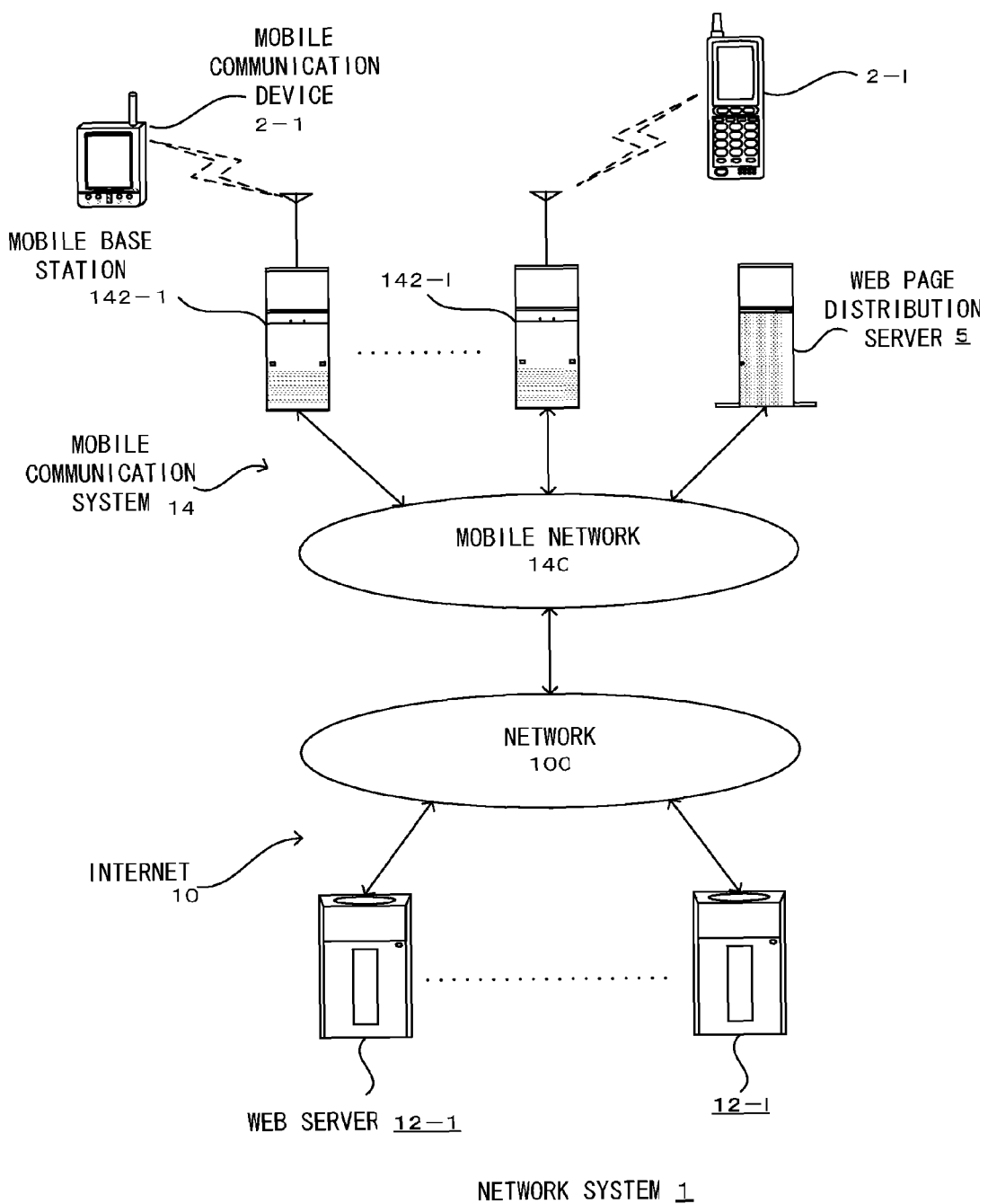
FIG. 1 is a diagram illustrating a configuration of a network system to which a data distribution method according to the present invention is applied.

FIG. 1 is a diagram illustrating a configuration of a network system 1 to which a data distribution method according to the present invention is applied.

As shown in FIG. 1, the network system 1 includes the Internet 10 and a mobile communication system 14 which are mutually connected so as to communicate with each other.

The mobile communication system 14 is configured in such a manner that mobile base stations 142-1 to 142-l that communicate with mobile communication devices 2-1 to 2-l such as a PDA or a cellular phone are connected to a web page distribution server 5 on a mobile network 140.

The Internet 10 is configured in such a manner that nodes that mainly conduct information processing and information communication such as web servers 12-1 to 12-l (l is an integer equal to or larger than 1 (the same is applied to the following a, b, m, and n); all of l are not always the same number) that distribute document data are connected to a web page distribution server 5 on the network 100.

When, for example, the web servers 12-1 to 12-l being a plurality of components are indicated without specifying any one of those parts, the web servers 12-1 to 12-l will be merely called "web server 12" sometimes.

Figure 2:
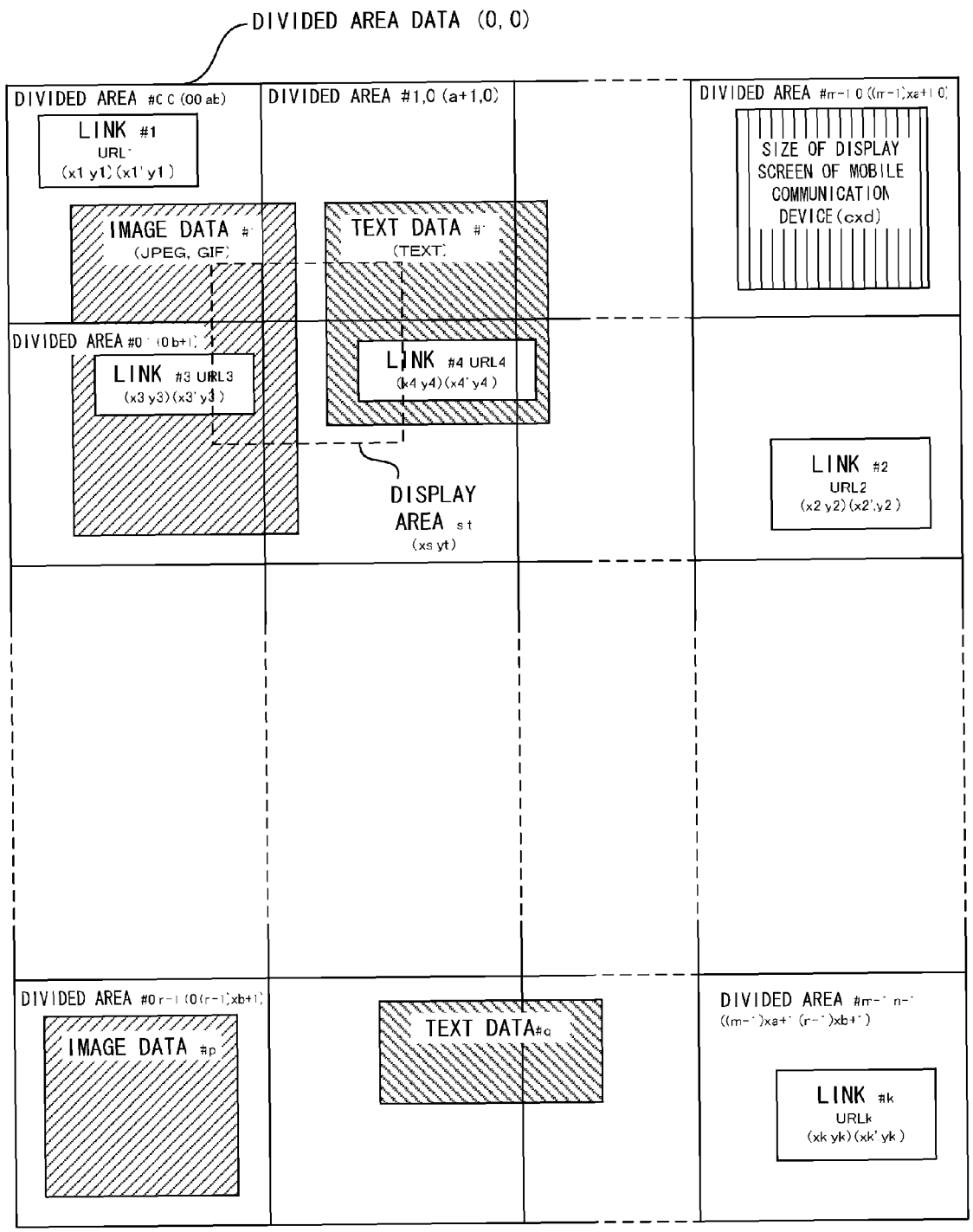
FIG. 2 is a diagram illustrating document data that is distributed by a web server shown in FIG. 1, web data that is produced by a web page distribution server, and divided area data that is distributed by the web page distribution server.

FIG. 2 is a diagram illustrating document data that is distributed by the web server 12 shown in FIG. 1, web data that is produced by the web page distribution server 5, and divided area data that is distributed by the web page distribution server 5.

The document data is generally described by hyper text markup language (HTML), and distributed to the web page distribution server 5 from the web server 12 by the aid of hyper text transfer protocol (HTTP).

As shown in FIG. 2, the document data includes:

(a) data such as text data, JPEG format or GIF format data to be displayed on the mobile communication device 2 as an image (hereinafter, general data to be displayed as an image is generically named "contents data"); and (b) location of a resource of the Internet 10 which is linked from the document data (for example, URL: universal resource locator).

As shown in FIG. 2, the contents data that is included in one piece of document data can be displayed as a single image serving as a web page.

The image is provided with an area for displaying the link, and the area is embedded with a linked URL, which is provided for referring to linked data by a user.

In the network system 1, data is distributed from the web page distribution server 5 to the mobile communication device 2 and then displayed in the procedure indicated by the following items (1) to (4).

(1) The web server 12 (data distribution device in question) distributes the document data shown in FIG. 2 to the web page distribution server 5 (display data distribution device) according to a request from the mobile communication device 2 (data display device) through the web page distribution server 5.

(2) The web page distribution server 5 produces an image of the distributed document data, divides the produced image into a plurality of areas (divided areas), and produces divided area data (display data).

(3) The web page distribution server 5 sequentially distributes the data to be actually displayed among the produced divided area data to the mobile communication device 2 according to a request from the mobile communication device 2.

(4) The mobile communication device 2 sequentially displays the divided area data that is distributed from the web page distribution server 5.

Each of the divided area data includes:

(a) data of an image within the divided area (image data);

(b) URL etc. attached to a link included within the divided area (display area data);

(c) data that indicates the position of the divided area in the overall image of the document data by coordinates, and is used for display (divided area position data); and (d) data that indicates the display position of the link in the overall image of the document data or each of the divided areas, and is used for display (display area position data).

(Hardware)

Subsequently, a description will be given of the hardware of the respective nodes in the network system 1.

Figure 3:
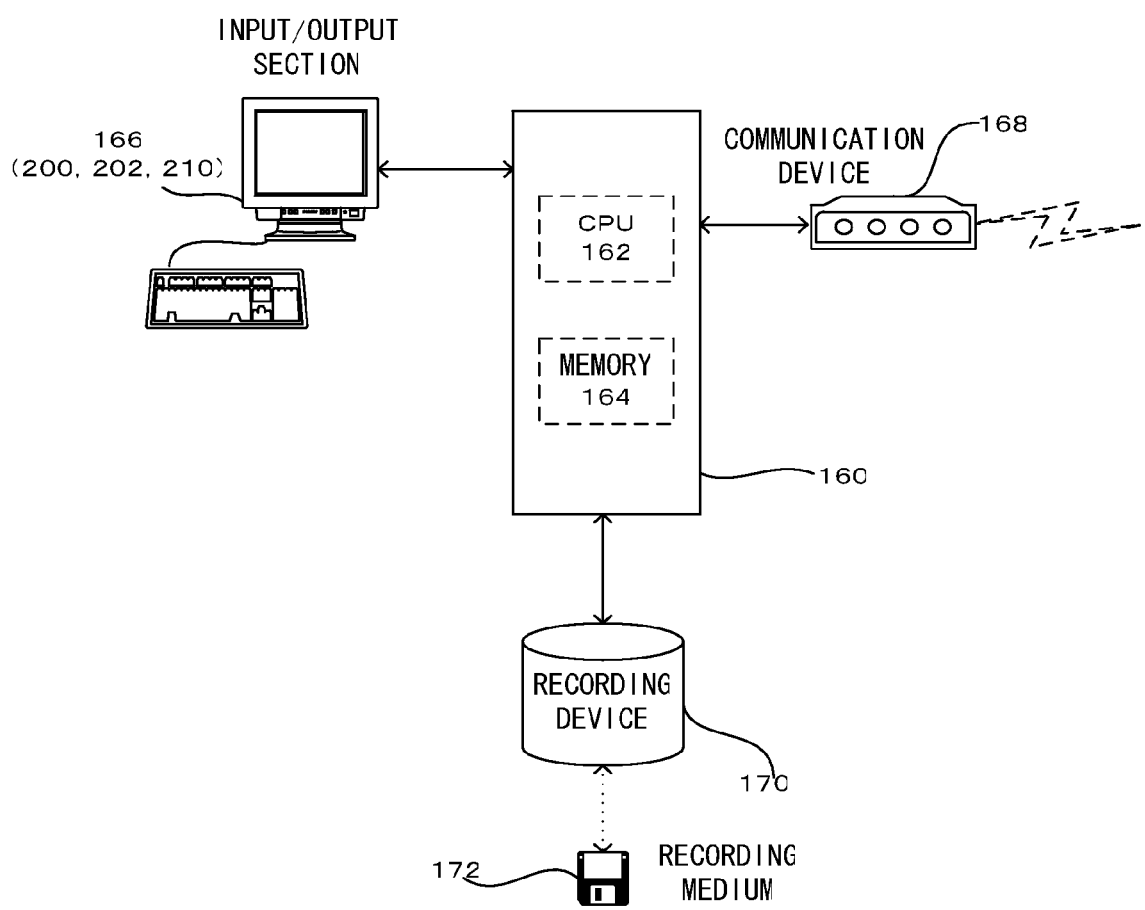
FIG. 3 is a diagram illustrating hardware of a mobile communication device, the web server, and the web page distribution server shown in FIG. 1.

FIG. 3 is a diagram illustrating the hardware of the mobile communication device 2, the web server 12, and the web page distribution server 5 shown in FIG. 1.

As shown in FIG. 3, each of the mobile communication device 2, the web server 12, and the web page distribution server 5 consists of a main body 160 including a CPU 162 and a memory 164, an input/output section 166 including a keyboard and a display device, a communication device 168 that conducts a communication with another node, a recording device 170 that stores and reproduces data with respect to a recording medium 172 such as a CD device or a hard disk device, and like.

In other words, the mobile communication device 2, the web server 12, and the web page distribution server 5 include components that function as a computer which is capable of communicating with another node.

Figure 4:
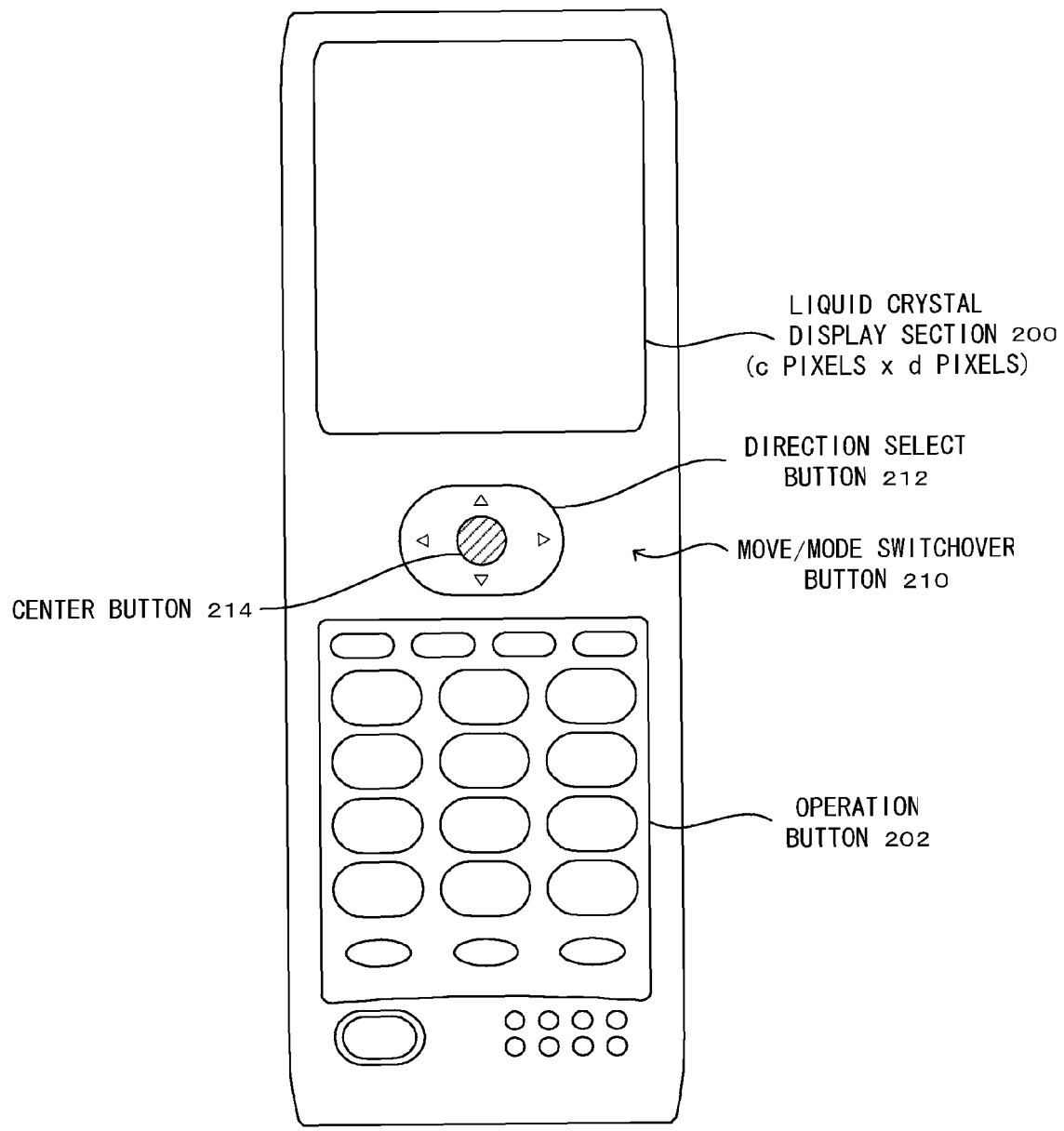
FIG. 4 is a diagram illustrating an input/output section (FIG. 3) of the mobile communication device shown in FIG. 1.

FIG. 4 is a diagram exemplifying the input/output section 166 (FIG. 3) of the mobile communication device 2 shown in FIG. 1.

The mobile communication device 2 is, for example, a cellular phone, and includes, as the input/output section 166, a liquid crystal display section 200 having a screen of c pixels×d pixels in size, operation buttons 202 such as ten keys, and move/mode switchover buttons 210 including direction select buttons 212 and a center button 214, as shown in FIG. 4.

The size of the liquid crystal display section 200 is generally much smaller than the size of the display device of a stationary computer.

(Software)

Subsequently, a description will be given of the software of the respective nodes of the network system 1.

The following program shown in the respective figures is supplied to the respective nodes, for example, through the recording medium 172 (FIG. 3), loaded in the memory 164, and executed on an OS (not shown) that operates on the respective nodes by specifically using the hardware.

(Web Page Distribution Program 50)

Figure 5:
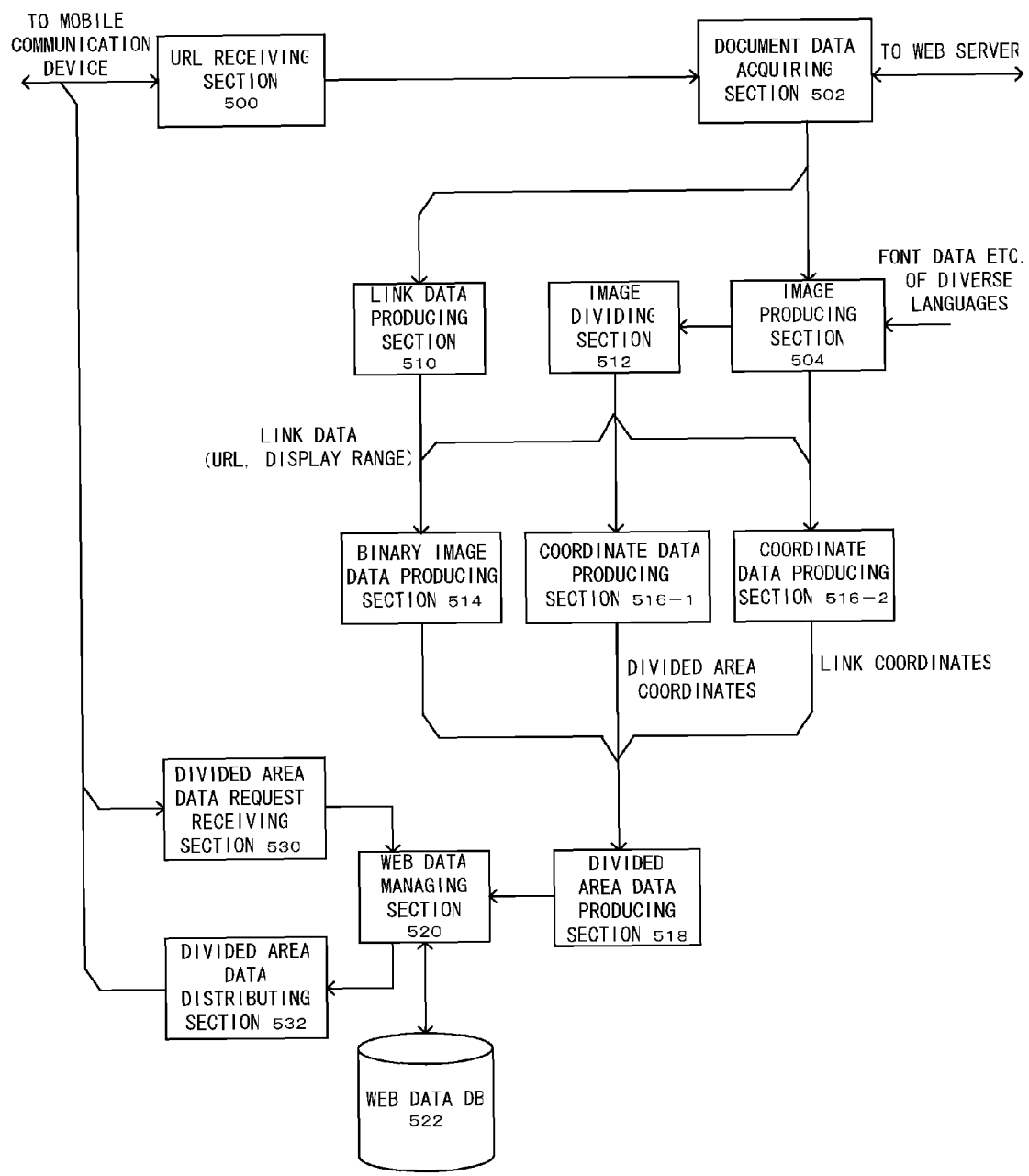
FIG. 5 is a diagram illustrating web page distribution program that operates in the web page distribution server shown in FIG. 1.

FIG. 5 is a diagram illustrating web page distribution program 50 that operates in the web page distribution server 5 shown in FIG. 1.

As shown in FIG. 5, the webpage distribution program 50 consists of a URL receiving section 500, a document data acquiring section 502, an image producing section 504, a link data producing section 510, an image dividing section 512, a binary image data producing section 514, coordinate data producing sections 516-1 and 516-2, a divided area data producing section 518, a web data managing section 520, a web data database (web data DB) 522, a divided area data request receiving section 530, and a divided area data distributing section 532.

The web page distribution program 50 produces the image of the document data that has been distributed from the web server 12 by the aid of those components, divides the produced image into a plurality of divided areas according to the size of the liquid crystal display section 200 (FIG. 4) of the mobile communication device 2, and sequentially distributes the images of the divided areas which are actually used for the image display of the document data in the liquid crystal display section 200, and the URL included in the images to the mobile communication device 2.

In the web page distribution program 50, the URL receiving section 500 receives a user desired URL which is transmitted from the mobile communication device 2 according to the operation of the mobile communication device 2 by the user such as the input of the URL or the select of the links which are displayed on the mobile communication device 2, a request of the document data acquisition from the resource indicated by the URL, and an address of the mobile communication device 2 that has requested the acquisition of the document data.

The URL receiving section 500 outputs the URL, the document data acquisition request, and the address of the mobile communication device 2 which have been received to the document data acquiring section 502.

The URL receiving section 500 outputs the URL and the address of the mobile communication device 2 which have been received to the web data management section 520.

The document data acquiring section 502 requires the distribution of the document data of the resource indicated by the URL which is input from the URL receiving section 500 of the web server 12.

The document data acquiring section 502 acquires the document data (FIG. 2) that is returned from the web server 12 according to the request, and outputs the document data to the image producing section 504 and the link data producing section 510.

The image producing section 504 analyzes the document data that has been input from the document data acquiring section 502, and produces the image data that indicates the image of the contents data (image of the web page; FIG. 2).

The image producing section 504 stores the data that is used for display of the document data such as font data of diverse languages therein. The image producing section 504 appropriately selects the above-mentioned stored data according to the contents of the document data, and uses the selected data for analysis of the document data, to thereby deal with the document data of the diverse languages.

The image producing section 504 outputs the produced image data to the image dividing section 512, the binary image data producing section 514, and the coordinate data producing sections 516-1 and 516-2.

The link data producing section 510 extracts the respective URLs of the links #1 to #k (FIG. 2) that are included in the document data which has been input from the document data acquiring section 502, and the display range data indicating their display range by the format of the coordinates.

The display range data indicates the positions of the images of the document data at the left upper pixel and the right lower pixel of the display range of, for example, the links #1 to #k by the coordinate format (x1 pixel, y1 pixel), (x1' pixel, y1' pixel) to (xk pixel, yk pixek), (xk' pixel, yk' pixel).

The link data producing section 510 associates the extracted URIs with the display position data to produce the link data, and outputs the produced link data to the coordinate data producing section 516-2.

The image dividing section 512 divides the image data that has been input from the image producing section 504 into m×n areas (divided areas (0, 0) to (m−1, n−1) having a size (a pixels×b pixels) which is suitable for display on the liquid crystal display section 200 (FIG. 4) of the mobile communication device 2, produces the image data indicative of the respective images of the divided areas (0, 0) to (m−1, n−1), and outputs the produced image data to the binary image data producing section 514.

It is preferable that the size (a pixels×b pixels) of the divided areas have a slight margin with respect to the size (c pixels×d pixels) of the liquid crystal display section 200 (a≧c, b≧d) so that, even if the display range is slightly changed after the data in a certain divided area has been transmitted to the mobile communication device 2 and displayed on the liquid crystal display section 200, data in the adjacent divided area may not be transmitted immediately.

The binary image data producing section 514 converts the respective image data of the divided areas (0, 0) to (m−1, n−1) which have been input from the image dividing section 512 into the binary format data, and produces the binary image data (0, 0) to (m−1, n−1).

The binary image data producing section 514 outputs the produced binary image data (0, 0) to (m−1, n−1) to the divided area data producing section 518.

The coordinate data producing section 516-1 processes the image data of the overall document data that is input from the image producing section 504 and the respective image data of the divided areas (0, 0) to (m−1, n−1) which are input from the image dividing section 512, and produces the divided area position data indicating which position in the image of the overall document data is occupied by the images that are included in the respective divided areas (0, 0) to (m−1, n−1).

The divided area position data of the divided areas (0, 0) to (m−1, n−1) indicates, for example, the positions of the images of the divided areas (0, 0) to (m−1, n−1) by the coordinate formats (0 pixel, 0 pixel) to ((m−1)×a+1 pixel, (n−1)×b+1 pixel) as the positions of the images of the overall document data of the left upper pixels thereof.

In the all mobile communication devices 2, when the size of the divided areas is known, the coordinate data producing section 516-2 needs to indicate the sequence data (0, 0) to (m−1, n−1) attached to the divided areas as the coordinate data of the respective divided areas (0, 0) to (m−1, n−1).

The coordinate data producing section 516-1 outputs the produced divided area position data to the divided area data producing section 518 and the coordinate data producing section 516-2.

The coordinate data producing section 516-2 processes display range data ((x1 pixel, y1 pixel), (x1' pixel, y1' pixel) to (xk pixel, yk pixel), (xk' pixel, yk' pixel)) which are included in the link data that is input from the link data producing section 510, and the divided area position data ((0 pixel, 0 pixel) to ((m−1)×a+1 pixel, (n−1)×b+1 pixel)) which are input from the coordinate data producing section 516-1, determines in which divided area which link is indicated, and further produces the display range data that indicates the display range of the link in the respective divided areas (0, 0) to (m−1, n−1) by, for example, the coordinate format.

The coordinate data producing section 516 associates the URLs that are displayed on the respective divided areas (0, 0) to (m−1, n−1) with the display range data that indicates the display range of the respective URLs in the respective divided areas (0, 0) to (m−1, n−1), and produces the link data (0, 0) to (m−1, n−1) of the respective areas (0, 0) to (m−1, n−1).

The coordinate data producing section 516-2 outputs the produced link data (0, 0) to (m−1, n−1) to the divided area data producing section 518.

FIG. 6 is a diagram illustrating the divided area data (i, j) of the divided area (i, j) which is produced by the divided area data producing section 518 of the web page distribution program 50 shown in FIG. 5.

The divided area data producing section 518 associates the binary image data (i, j) of the divided areas (i, j; i=0 to m−1, j=0 to n−1) which are input from the binary image data producing section 514, the divided area position data (i, j; (i−1)×a+1 pixel, (j−1)×b+1 pixel) of the divided areas (i, j), and the link data (i, j) of the divided areas (i, j) with each other, and produces the divided area data (i, j) of the divided area (i, j).

The divided area data producing section 518 outputs the produced divided area data (i, j) to the web data managing section 520.

Figure 7:
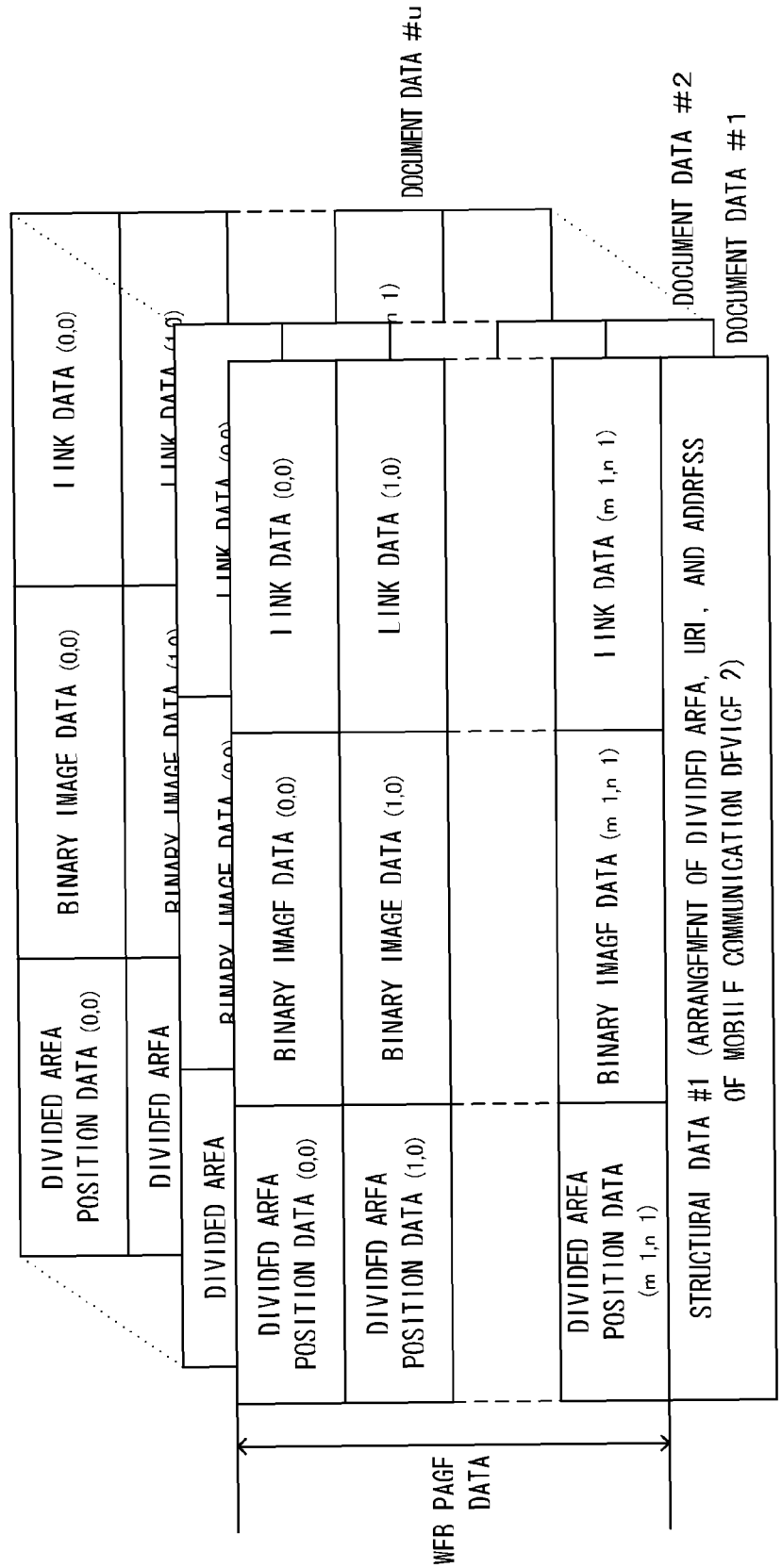
FIG. 7 is a diagram illustrating webpage data and distribution data which are managed by a web data management section of the web page distribution program shown in FIG. 5.

FIG. 7 is a diagram showing the web page data which is managed by the web data managing section 520 of the web page distribution program 50 shown in FIG. 5, and the distribution data.

The web data managing section 520 stores the divided area data (i, j) that is input from the divided area data producing section 518 in the web data DB 522.

The web data DB 522 stores the divided area data (0, 0) to (m−1, n−1) of the divided areas (0, 0) to (m−1, n−1) therein, and the divided area data (0, 0) to (m−1, n−1) constitutes the web page data for displaying the image of one piece of document data as a whole as shown in FIG. 2.

The web data DB 522 stores the web page data that has been produced in the respective document data #1 to #u which are distributed from the web server 12.

In addition, the web data managing section 520 produces the distribution data that is indicative of information (position data, image data, and link data) required in order to distribute the divided area data with respect to the mobile communication device 2 such as a configuration with which the divided area data is included in the respective web page data that is stored in the web data DB 522 (arrangement of the divided areas), or the address of the mobile communication device 2 that requests the URL of the document data and the acquisition of the document data, and stores the information in the web data DB 522 as shown in FIG. 7.

The web data managing section 520 adds the distribution data of the web page data to the divided area data (i, j; the divided area data (0, 0) in most cases) which should be first transmitted to the mobile communication device 2 with respect to the web page data, and outputs the data to the divided area data distributing section 532.

Further, the web data managing section 520 extracts the divided area data (i, j) that is actually displayed on the liquid crystal display section 200 of the mobile communication device 2 from the web page data that is stored in the web data DB 522 according to a request from the mobile communication device 2 through the divided area data request receiving section 530, and outputs the extracted data to the divided area data distributing section 532.

The divided area data request receiving section 530 receives a request for transmission of the divided area data, data indicative of the divided area data that requests the transmission, and data indicative of the mobile communication device 2 that has requested the transmission of the divided area data from the mobile communication device 2.

The divided area data request receiving section 530 outputs the data indicative of the divided area data that has been requested from the mobile communication device 2 to the web data managing section 520, and requests the divided area data.

Also, the divided area data request receiving section 530 outputs the data indicative of the divided area data the transmission of which is requested, and the data indicative of the mobile communication device 2 that has requested the transmission of the divided area data to the divided area data distributing section 532.

Figure 8:
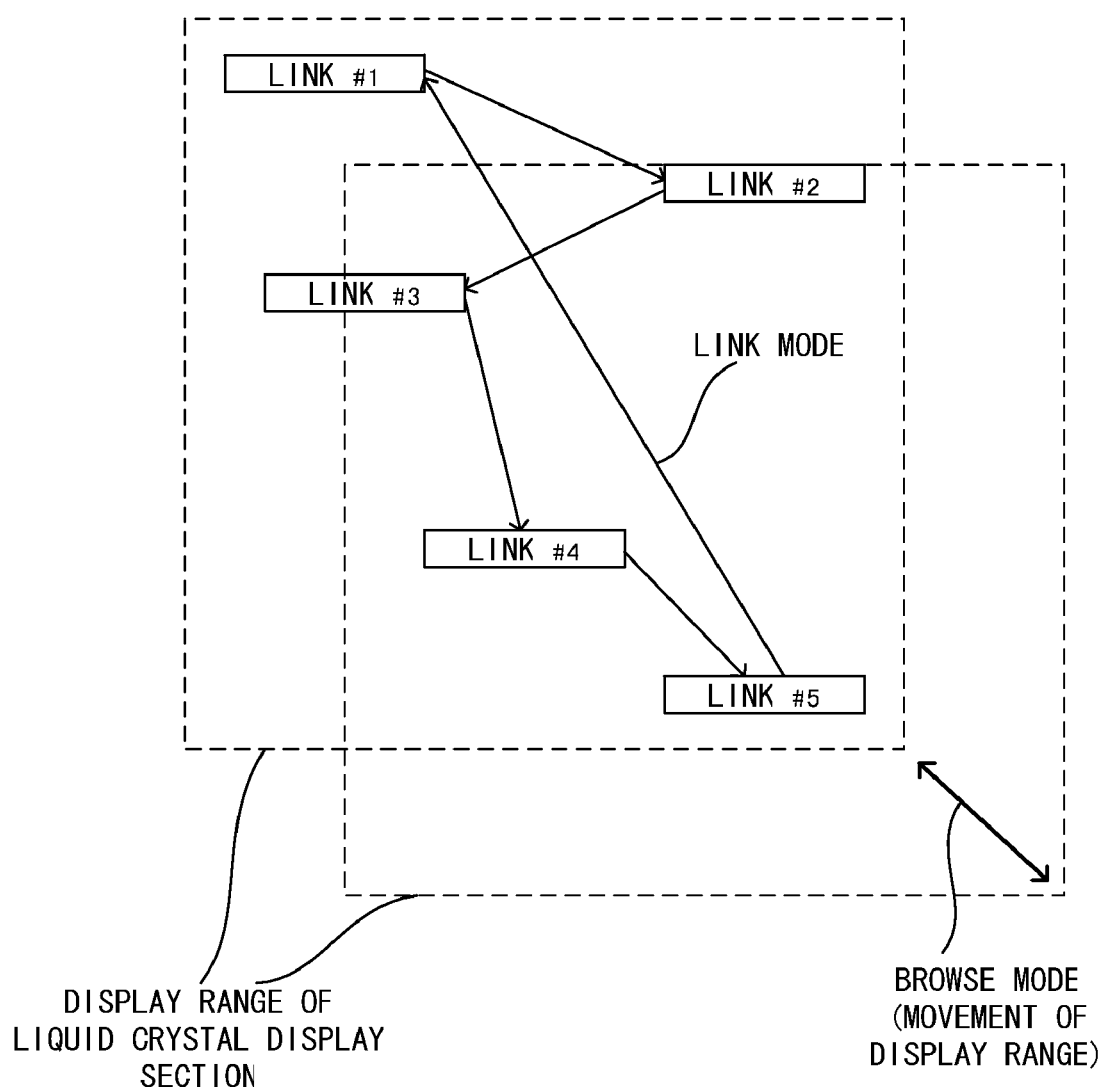
FIG. 8 is a diagram illustrating movement of a display range of an image which is displayed on a liquid crystal display section of the mobile communication device shown in FIG. 1, and the selection of links that are included in a display image.

FIG. 8 is a diagram illustrating the movement of a display range of an image which is displayed on the liquid crystal display section 200 of the mobile communication device 2 shown in FIG. 1, and the selection of links that are included in the displayed image.

The request of the divided area data from the mobile communication device 2 occurs, for example, when the user moves the display range of the image as shown in FIG. 8.

That is, for example, when the image of the divided area (0, 0) shown in FIG. 2 is displayed on the liquid crystal display section 200 (FIG. 4) of the mobile communication device 2, the user operates the direction select buttons 212 (FIG. 4) of the mobile communication device 2 to move the image display range in a direction of the divided area (1, 0). Therefore, when there occurs the necessity that the display of the divided area (1, 0) is displayed on the liquid crystal display section 200, the mobile communication device 2 requests the transmission of the divided area data (1, 0) of the divided area (1, 0) with respect to the web page distribution server 5.

The divided area data distributing section 532 sequentially distributes the divided area data and the distribution data which are input from the web data managing section 520 to the mobile communication device 2.

(Viewer Program 22)

Figure 9:
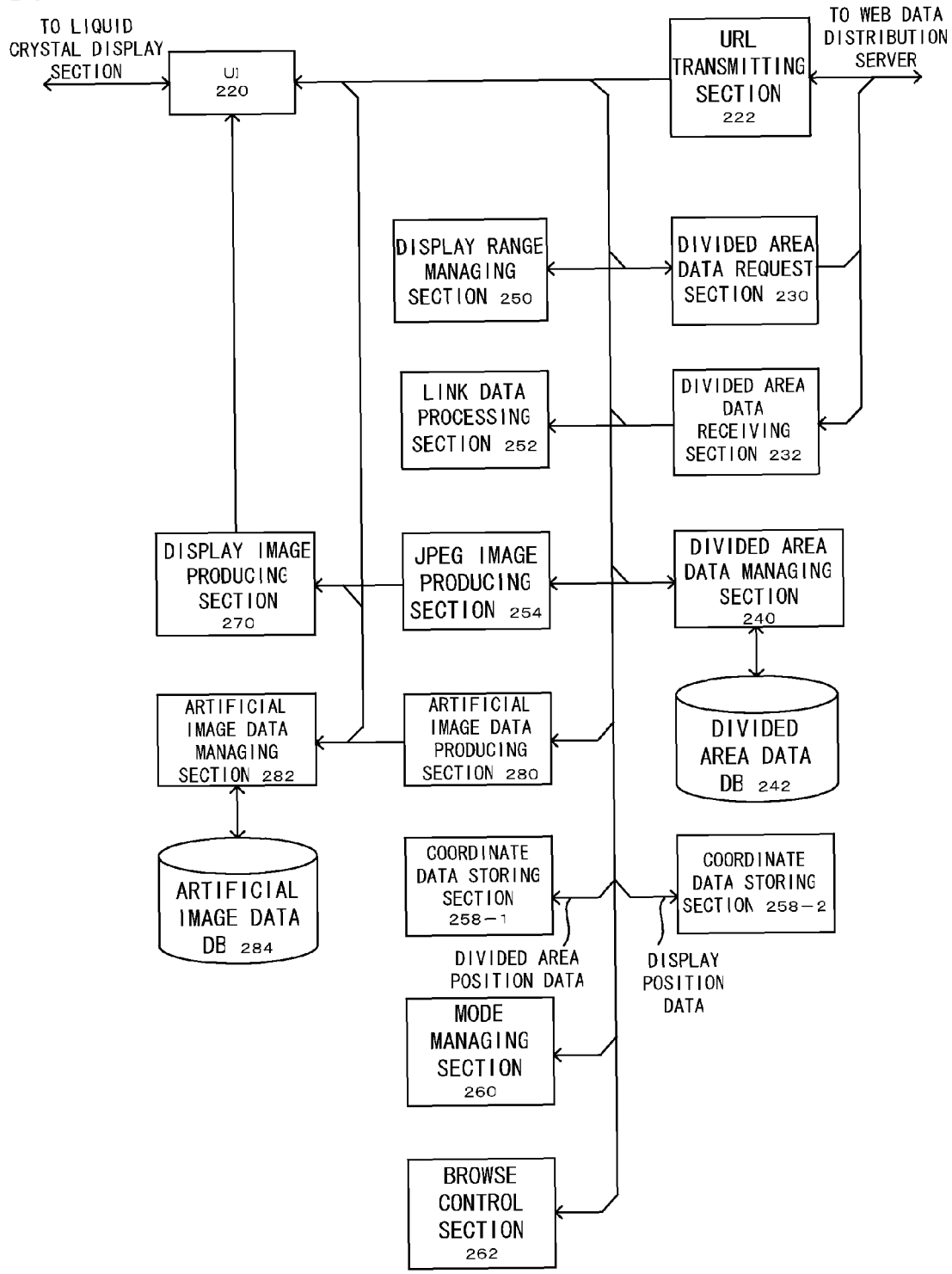
FIG. 9 is a diagram illustrating viewer program which is executed in the mobile communication device shown in FIG. 1, and displays the divided area data (FIGS. 2 and 6) on a liquid crystal display section (FIG. 4).

FIG. 9 is a diagram illustrating viewer program 22 which is executed in the mobile communication device 2 shown in FIG. 1, and displays the divided area data (FIGS. 2 and 6) on the liquid crystal display section 200 (FIG. 4).

As shown in FIG. 9, the viewer program 22 is made up of a user interface section (UI section) 220, a URL transmitting section 222, a divided area data request section 230, a divided area data receiving section 232, a divided area data managing section 240, a divided area data DB 242, a display area managing section 250, a link data processing section 252, a JPEG image producing section 254, coordinate data storing sections 258-1 and 258-2, a mode managing section 260, a browse control section 262, a display image producing section 270, an artificial image data producing section 280, an artificial image data managing section 282, and an artificial image data DB 284.

The viewer program 22 conducts an access to the web server 12 through the web page distribution server 5 and a request for distribution of the divided area data to the web page distribution server 5 by the aid of those components according to the operation of the user, and then displays the divided area data that is distributed according to the distribution request on the liquid crystal display section 200.

Figure 10:
FIG. 10 is a diagram illustrating artificial image data that is produced by an artificial image data producing section of the viewer program shown in FIG. 9.

FIG. 10 is a diagram illustrating artificial image data that is produced by the artificial image data producing section 280 of the viewer program 22 shown in FIG. 9.

In the viewer program 22, the UI section 220 receives the user's operation such as a change in the image display range or the select of the links with respect to the input/output section 166 (FIG. 4) of the mobile communication device 2, outputs the data indicative of the received operation to the respective components of the viewer program 22, and controls the operation of the respective components of the view program 22.

Also, the UI section 220 displays the JPEG image that is input from the display image producing section 270 and the artificial image data that is input from the artificial image data managing section 282 (FIG. 10) on the liquid crystal display section 200.

The URL transmitting section 222 receives the user's desired URL and a request for acquisition of the document data which is indicated by the URL from the UI section 220 and the link data processing section 252.

The viewer program 221 transmits the user's desired URL and the request for acquisition of the document data together with the address of the mobile communication device 2 to the web page distribution server 5.

The divided area data request section 230 requires the distribution of the divided area data which is required together with the change of the image display range on the liquid crystal display section 200 (FIG. 8) of the web page distribution server 5.

The divided data receiving section 232 receives the divided area data and the distribution data (FIGS. 2, 6, and 7) which are distributed from the web page distribution server 5, and then outputs the received divided area data and distribution data to the divided area data managing section 240.

The divided area data managing section 240 stores the divided area data and the distribution data which are input from the divided area data receiving section 232 in the divided area data DB 242.

The divided area data managing section 240 outputs the divided area data and the distribution data which have been stored in the divided area data DB 242 to another component of the viewer program 22 on demand as the occasion demands.

The mode managing section 260 controls the operation of the respective components of the viewer program 22, and switches over the operation mode of the viewer program 22 to a browse mode or a link mode (FIG. 8) according to the user's operation of the center button 214 of the movement/mode switchover buttons 210 (FIG. 4) in the liquid crystal display section 200.

The operation mode of the viewer program 22 switches over from the browse mode to the link mode, or from the link mode to the browse mode, for example, every time the user depresses the center button 214.

As shown in FIG. 8, when the viewer program 22 operates in the browse mode, for example, the operation of the direction select buttons 212 is treated as the operation for moving the display range of the liquid crystal display section 200 by means of the UI section 220 and the browse control section 262.

And, when the viewer program 22 operates in the link mode, for example, the operation of selecting the upward or downward of the direction select buttons 212 is treated as the operation of selecting cursor highlights on the link which is displayed on the liquid crystal display section 200 in order by means of the UI section 220 and the link data processing section 252.

Further, when the viewer program 22 operates in the link mode, the operation of selecting the horizontal direction of the direction select buttons 212 is treated as the operation of selecting the URL that is attached to the link with the cursor highlight at that time, or as the operation of canceling the select of the URL by means of the UI section 220, the link data processing section 252, and the like.

The coordinate data storing section 258-1 obtains the divided area position data (FIG. 7) of the respective divided area data that has been already distributed from the display range managing section 250, stores the obtained data therein, and provides for use of another component of the viewer program 22 such as the display range managing section 250 and the link data processing section 252.

The coordinate data storing section 258-2 obtains the display position data included in the link data (FIG. 7) of the respective divided area data that has been already distributed from the display range managing section 250, stores the obtained data therein, and provides for use of another component of the viewer program 22 such as the display range managing section 250 and the link data processing section 252.

The display range managing section 250 processes the divided area position data and the display position data which have been stored in the coordinate data storing sections 258-1 and 258-2 according to the operation of the direction select buttons 212 by the user, and determines which portion of the binary image data included in which divided area data is included in the display range of the liquid crystal display section 200.

And, the display range managing section 250 determines which URL is displayed on which range of the image that is displayed on the liquid crystal display section 200.

Further, the display range managing section 250 outputs those determination results to other components of the viewer program 22 such as the link data processing section 252, the JPEG image processing section 254, the browse control section 262, and the display image producing section 270.

The link data processing section 252 controls the UI section 220 according to the determination results of the display range managing section 250, and the operation of the user in the above-mentioned link mode shown in FIG. 8, and conducts the processing for displaying the cursors with respect to the links that are included in the display range of the liquid crystal display section 200, or displaying the highlight of the links.

And, the link data processing section 252 outputs the URL that has been selected according to the operation of the user in the link mode to the URL transmitting section 222.

When new divided area data is to be displayed on the liquid crystal display section 200 according to the determination results of the display range managing section 250, the JPEG image producing section 254 converts the binary image data that is included in the new divided area data into the JPEG format data, and outputs the converted data to the display image producing section 270.

The browse control section 262 controls the operation of the UI section 220 and the display image producing section 270 according to the operation of the user in the above-mentioned browse mode shown in FIG. 8, and conducts the processing for moving the display range of the liquid crystal display section 200 and the processing for enlarging or reducing the image that has been displayed on the liquid crystal display section 200.

The display image producing section 270 extracts the range to be displayed on the liquid crystal display section 200 from the image data of the JPEG format which has been produced by the JPEG image producing section 254 according to the determination results of the display range managing section 250 and the control of the browse control section 262, and produces the image to be displayed on the liquid crystal display section 200.

The JPEG image producing section 254 converts the binary image data into the image data of the JPEG format only when the divided area data is newly acquired and displayed.

The converting process is extremely large in throughput as compared with the processing for merely moving, enlarging, or reducing the image in the liquid crystal display section 200.

Accordingly, when mere movement, enlargement or reduction of the image on the liquid crystal display section 200 are carried out in the viewer program 22, the display screen producing section 270 uses the image data of the JPEG format which has been produced by the JPEG image producing section 254 according to the control of the browse control section 262.

Therefore, according to the viewer program 22, the operability of the mobile communication device 2 is improved since the throughput and a delay caused by the processing are reduced as compared with a case of producing the image data of the JPEG format even when the image is merely moved.

For example, when the mobile communication device 2 is a cellular phone that can conduct the storage management of only the image data, the artificial image data producing section 280 adds thumbnail image data indicative of the contents of the contents data to one or more pieces of contents data which has been transmitted as an attachment of an e-mail from the web server 12, and also adds execution control data for executing the contents data thereto, to thereby produce the artificial image data that can be artificially dealt with as the image data, as shown in FIG. 10.

The artificial image data producing section 280 outputs the produced artificial image data to the artificial image data managing section 282.

The artificial image data managing section 282 stores the artificial image data that has been input from the artificial image data producing section 280 in the artificial image data DB 284.

The artificial image data managing section 282 outputs the artificial image data that has been stored in the artificial image data DB 284 to the UI section 220 according to the operation for displaying and outputting the contents data.

(Overall Operation of Network System 1)

Hereinafter, the overall operation of the network system 1 will be described.

Figure 11:
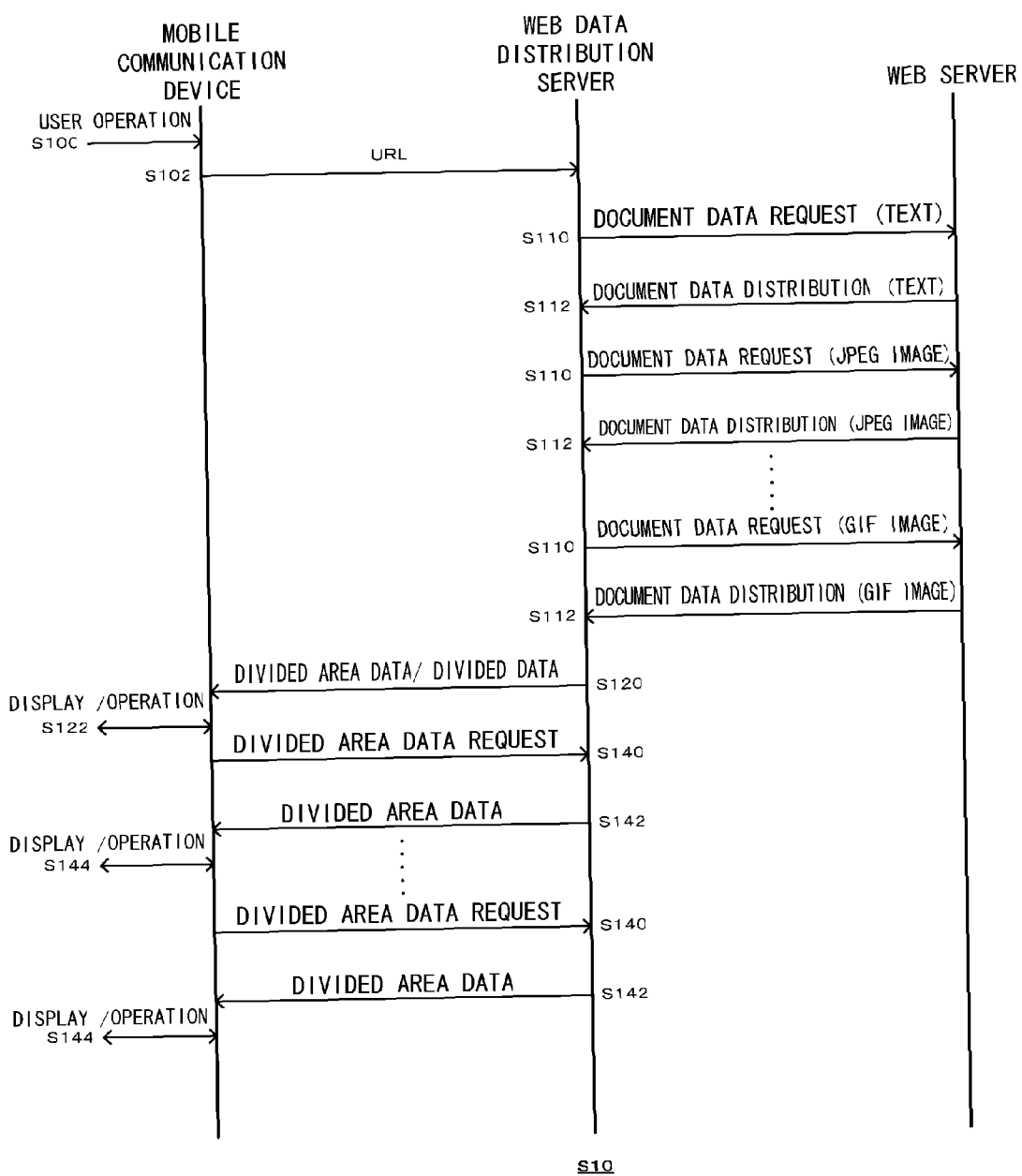
FIG. 11 is a communication sequence diagram illustrating the overall operation (S10) of the network system shown in FIG. 1.

FIG. 11 is a communication sequence diagram illustrating the overall operation (S10) of the network system 1 shown in FIG. 1.

As shown in FIG. 11, in Step 100 (S100), the user operates the input/output section 166 (FIG. 4) of the mobile communication device 2, and a URL desired by a user is input to the mobile communication device 2.

In Step 102 (S102), the mobile communication device 2 transmits the input URL to the web page distribution server 5.

In Step 110 (S110), the web page distribution server 5 requires the distribution of the document data indicated by the URL or the contents data of the web server 12.

In Step 112 (S112), the document data or the contents data is distributed to the web server 12.

The processing of S110 and S112 is conducted a plurality of times as the occasion demands until all of necessary data is distributed to the web page distribution server 5.

In Step 120 (S120), the web page distribution server 5 distributes the divided area data to be first displayed on the liquid crystal display section 200 (FIG. 4) to the mobile communication device 2.

In Step 122 (S122), the mobile communication device 2 displays the image of the distributed divided area data on the liquid crystal display section 200.

The user conducts the operation for, for example, moving the image that is displayed on the liquid crystal display section 200 with respect to the mobile communication device 2 according to the displayed image.

In Step 140 (S140), the mobile communication device 2 requires the distribution of the required divided area data of the web page distribution server 5 when it is determined that the new divided area data is required with the movement of the image or the like.

In Step 142 (S142), the web page distribution server 5 distributes the required divided area data to the mobile communication device 2.

In Step 144 (S144), the mobile communication device 2 displays the image of the distributed divided area data on the liquid crystal display section 200.

The user conducts the operation for moving the image that is displayed on the liquid crystal display section 200 with respect to the mobile communication device 2 according to the displayed image.

The steps S140 to S144 can be repeated a plurality of times according to the operation of the user.

INDUSTRIAL APPLICABILITY

The present invention is applicable for distribution of data.

The invention claimed is:

1. A data distribution system, comprising:
a subject data distribution device for distributing subject data to be accessed;
a display data distribution device for distributing display data that is used for display of contents of the distributed subject data;
a data display device for displaying the distributed display data on a display screen having a given size,
wherein the display data distribution device comprises:
subject data receiving means for receiving the subject data which is distributed by the subject data distribution device, and whose contents are displayed on the data display device;

dividing means for dividing the contents of the received subject data into a plurality of divided areas so that each of the divided areas is larger in size than the display screen, wherein at least one of the divided areas extends outside of all sides of the display area;

display data producing means for producing the display data that is used for displaying the plurality of divided areas which have been obtained by the division; and display data distributing means for distributing the display data that is to be displayed on the display screen to the data display device, and wherein the data display device comprises:

display data receiving means for receiving the display data that has been distributed by the display data distribution device; and data display means for selectively displaying a displayed portion displayed on the displayed screen among the received display data on the display screen.

2. A data distribution device for distributing display data that is used for displaying contents of subject data to be accessed, and selectively displaying a portion corresponding to a display screen having a given size among distributed data on the display screen, the data distribution device comprising:

subject data receiving means for receiving the subject data which is accessed and whose contents are displayed on the display screen;

dividing means for dividing the contents of the received subject data into a plurality of divided areas so that each of the divided areas is larger in size than the display screen, wherein at least one of the divided areas comprises a margin extending outside of all sides of the display area;

display data producing means for producing the display data that is used for displaying the plurality of divided areas which have been obtained by the division; and display data distributing means for distributing the produced display data to the data display device.

3. A data distribution device according to claim 2, wherein the plurality of divided areas are in an original format as a display represented by the received subject data.

4. A data distribution device according to claim 2, wherein the contents of the subject data includes contents data that can be displayed as an image, and the data display device displays an image of the contents data included in the divided areas as contents on the display screen according to divided area position data indicative of a position occupied by the image of the contents data in an image that is obtained from the contents data included in the subject data, wherein the dividing means divides the image of the contents data into the plurality of divided areas according to the size of the display screen, wherein the display data producing means produces the display data including image data indicative of an image of the divided area which is obtained by the division, and the divided area position data of the divided area, and wherein the display data distributing means sequentially distributes the display data that is displayed on the display screen among the produced display data to the data display device.

5. A data distribution device according to claim 4, wherein the display data producing means produces the display data including the image data that indicates the image of the divided area which has been obtained by the division by a binary format.

6. A data distribution device according to claim 4, wherein the subject data further includes display area data which can be displayed in association with the display area within the image of the contents data, and the data display device further displays the display area data that is associated with the display area included in the image which is included in the divided area on the display screen according to display area position data indicative of the position of the display area in the image that is included in the divided area, and wherein the display data producing means produces the display data including the display area data which is associated with the display area included in the image which is included in the divided area, and the display area position data indicative of the position of the display area in the image that is included in the divided area.

7. A data distribution device according to claim 6, wherein the display area data is a URL of a resource that can be accessed from the data display device.

8. A data distribution device according to claim 7, wherein the subject data is document data that is distributed from a resource that can be accessed from the data display device by the URL.

9. A data display device for displaying display data on a display screen having a given size upon receiving distribution of the display data that is used for displaying contents of subject data to be accessed, the display data being used for displaying any one of a plurality of divided areas obtained by dividing the contents of the subject data so that each of the divided areas is larger in size than the display screen, wherein at least one of the divided areas extends outside of all sides of the display area, the data display device comprising:

display data receiving means for receiving the distributed display data; and data display means for selectively displaying a display portion displayed on the display screen among the received display data on the display screen.

10. A data display device according to claim 9, wherein the subject data includes contents data that can be displayed on the display screen as an image, the display data includes image data indicative of an image of contents data that is included in the divided area as contents and divided area position data indicative of a position occupied by the image of the contents data in an image that is obtained from the contents data included in the subject data, and the display data that is displayed on the display screen is sequentially distributed, wherein the display data receiving means sequentially receives the distributed display data, and wherein the data display means displays an image indicated by the image data of the divided area which is included in the received display data on the display screen according to the divided area position data indicative of the position of the divided area.

11. A data display device according to claim 10, wherein the subject data is document data that is distributed from a resource that can be accessed from the data display device by the URL.

12. A data display device according to claim 11, the contents of the image data in the divided area which is included in the display data being of a first format, the data display device further comprising converting means for converting the contents of the image data of the first format into image data of a second format which is different from the first format, wherein the data display means displays the image data of the second format which is obtained as conversion results on the display screen.

13. A data display device according to claim 12, wherein the first format is a binary format, and wherein the second format is both or one of a JPEG format and a GIF format.

14. A data display device according to claim 10, wherein the display data further includes display area data that is associated with the display area included in the image indicated by the image data which is included in the divided area, and display area position data indicative of a position of the divided area in the image which is indicated by the image data included in the divided area, and
wherein the data display means further displays display area data that is associated with the display area included in the image indicated by the image data which is included in the divided area on the display screen according to the display area position data indicative of a position of the display area on the image indicated by the image data which is included in the divided area.

15. A data display device according to claim 14, wherein the display area data is a URL of a resource that can be accessed from the data display device.

16. A data distribution method for distributing display data that is used for displaying contents of subject data to be accessed, and selectively displaying a portion corresponding to a display screen having a given size among the distributed display data on the display screen, the data distribution method comprising the steps of:
receiving the subject data which is accessed and whose contents are displayed on a data display device;
dividing the contents of the received subject data into a plurality of divided areas so that each of the divided areas is larger in size than the display screen, wherein at least one of the divided areas extends outside of all sides of the display area to form a margin around the display area;
producing the display data that is used for displaying the plurality of divided areas which have been obtained by the division; and
distributing the produced display data to the data display device.

17. A data distribution method according to claim 16, comprising displaying the plurality of divided areas in a same format as a display represented by the received subject data.

18. A data display method for displaying display data on a display screen having a given size upon receiving distribution of the display data that is used for displaying contents of subject data to be accessed, the display data being used for displaying any one of a plurality of divided areas obtained by dividing the contents of the subject data so that each of the divided areas is larger in size than the display screen forming a margin outside of all four sides of display area, the data display method comprising the steps of:
receiving the distributed display data; and
selectively displaying a displayed portion displayed on the display screen among the received display data on the display screen.

19. A non-transitory computer readable media encoded with computer executable instructions for a program for distributing display data that is used for displaying contents of subject data to be accessed, and causing apportion corresponding to a display screen having a given size among the distributed display data to be selectively displayed on the display screen, the program causing a computer to execute the steps of:
receiving the subject data which is accessed and whose contents are displayed on a data display device;
dividing the contents of the received subject data into a plurality of divided areas so that each of the divided areas is larger in size than the display screen to form a margin around all sides of the display screen;
producing the display data that is used for displaying the plurality of divided areas which have been obtained by the division; and
distributing the produced display data to the data display device.

20. A non-transitory computer readable media encoded with computer executable instructions for a program for displaying display data on a display screen having a given size upon receiving distribution of the display data that is used for displaying contents of subject data to be accessed, the display data being used for displaying any one of a plurality of divided areas obtained by dividing the contents of the subject data so that each of the divided areas is larger in size than the display screen, wherein at least one of the divided areas extends outside of all sides of the display area, the program causing a computer to execute the steps of:
receiving the distributed display data; and
selectively displaying a display portion displayed on the display screen among the received display data on the display screen.

* * * * *

UNITED STATES PATENT AND TRADEMARK OFFICE
CERTIFICATE OF CORRECTION

| | | |
|---|---|---|
| PATENT NO. | : 8,184,128 B2 | Page 1 of 1 |
| APPLICATION NO. | : 11/718228 | |
| DATED | : May 22, 2012 | |
| INVENTOR(S) | : Makoto Okita | |

It is certified that error appears in the above-identified patent and that said Letters Patent is hereby corrected as shown below:

On the Title page, in field (54), Title, in column 1, line 1, and in column 1, line 1, delete "SYSTEM" and insert -- SYSTEM, --, therefor.

In column 16, line 61, In Claim 12, delete "11," and insert -- 10, --, therefor.

Signed and Sealed this
Fourth Day of December, 2012

David J. Kappos
*Director of the United States Patent and Trademark Office*